April 30, 1968     M. SEYMOUR     3,380,299

BOAT SPEEDOMETER

Filed April 4, 1966

United States Patent Office 3,380,299
Patented Apr. 30, 1968

3,380,299
BOAT SPEEDOMETER
Malcolm Seymour, South Bristol, Maine, assignor to Prototypes, Inc., South Bristol, Maine, a corporation of Maine
Filed Apr. 4, 1966, Ser. No. 539,982
7 Claims. (Cl. 73—186)

ABSTRACT OF THE DISCLOSURE

A marine speedometer of the vane type having a flexible beam secured to the vane to flex in response to movement of the vane. Strain gauges mounted on the beam are used to determine the amount of flexure and the beam is surrounded and enclosed by a waterproof sleeve.

---

This invention relates to speedometers and more particularly to a strain gauge transducer device for measuring the speed at which a boat passes through the water.

It is a primary object of the present invention to provide a novel, impact-resistant, trouble free unit for gauging a boat's speed. Other objects include providing a speedometer unit for accurately gauging the speed of a high-speed boat that may be physically out of the water (planing) a major portion of the time, and providing a watertight, economical unit having the minimum possible number of movable or machined parts.

The invention provides a flexible beam, each end of which is secured to a plastic member, and means for measuring the flexure of the beam caused by the boat's movement through the water. One of the plastic members secured to the beam is adapted for mounting on the boat; the other extends into the water stream passing by the boat. The entire unit is then enclosed by a watertight, organic plastic sleeve, the ends of which are sealed to the plastic members. Preferred embodiments feature a pair of heat-shrunk, plastic collars which provide a double, watertight seal between the sleeve and the adjacent portions of the plastic members.

Other objects, features, and advantages will appear from the following detailed description of a preferred embodiment of the invention, taken together with the attached drawing thereof, in which.

Figure 1:
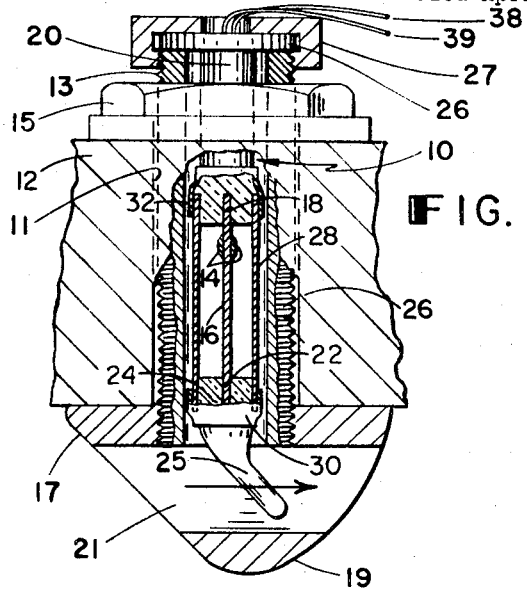
FIG. 1 is a side view, partially in section, of a transverse flow speedometer constructed according to the present invention.
Figure 2:
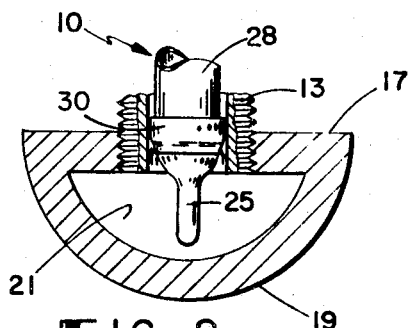
FIG. 2 is an end view, partly in section, of the speedometer of FIG. 1.

Referring more particularly to the drawings, there is shown in FIGS. 1 and 2 a transverse flow speedometer element, generally designated 10, mounted in a through bore 11 in the underside of the hull 12 of the boat whose speed is to be measured. An externally threaded mounting tube 13 supports speedometer 10 within said bore, by means of an internal nut 15 within the hull and an external threaded element 17 which preferably also protects the speedometer probe as hereinafter more fully explained. Speedometer 10 comprises a pair of strain gauge transducers 14 bonded to the opposite vertical faces of a relatively thin, flexible spring steel beam 16 in position for sensing bending stress in the beam. The upper end portion of beam 16, designated 18, is secured to an organic plastic mounting member 20, the upper end of which has a flange 26 which overlies the end of tube 13 and is secured to it by a cap nut 27. Transducer connecting wires 38, 39 extend through the center of cap nut 27. The lower end portion of beam 16, designated 22, is secured to an organic plastic mounting member 24 having a pliable organic plastic probe 25. When speedometer 10 is secured within tube 13 to hull 12, probe 24 extends outwardly, beyond hull 12 and the portion of element 17 in contact with the hull, at a rearward angle of inclination of approximately 20°–30° from the vertical to reduce the chances of damaging the speedometer as the boat moves through the water especially if the probe be unprotected. Preferably, however, as shown in FIGS. 1 and 2, probe 25 is enclosed within a protector 19 forming a part of element 17 and having a fore and aft extending tunnel 21 therein, the exterior configuration of protector 19 being preferably generally rounded to prevent its picking up debris.

Beam 16 and transducers 14 are enclosed by a waterproof vinyl sleeve 28, the opposite ends of which are secured to mounting members 20 and 24 respectively. To insure the required absolutely watertight fit, a pair of collars 30 and 32, made from a heat-shrinkable, organic plastic material, are provided in position overlapping the ends of sleeve 28 and tightly engaging both sleeve 28 and the adjacent portions of probe 24 mounting member 20.

Figure 3:
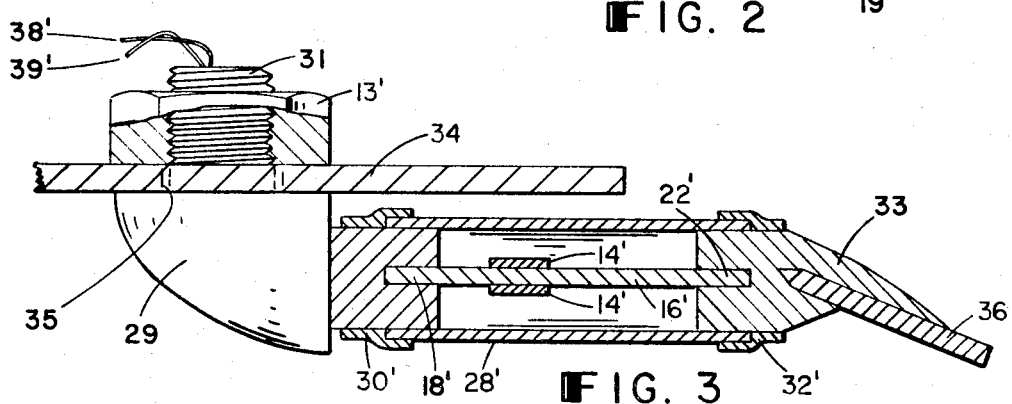
FIG. 3 is a side view partially in section, of an axial flow speedometer constructed according to the present invention.
Figure 4:
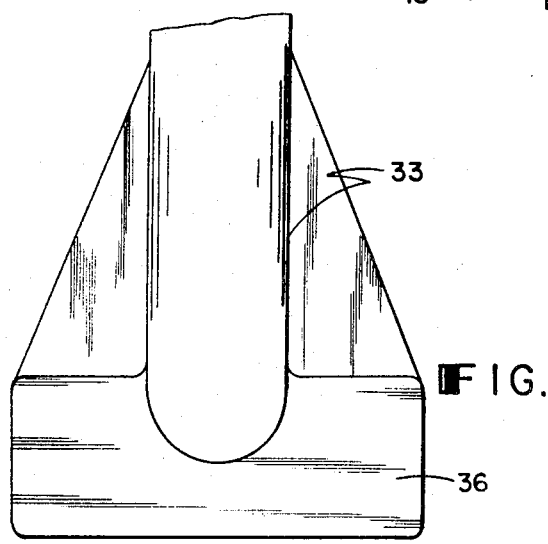
FIG. 4 is a partial plan view of the speedometer of FIG. 3.

FIGS. 3 and 4 illustrate a streamlined, torpedo-shaped, axial-flow speedometer, similar in operation to that of FIGS. 1 and 2, but specifically intended for use with, and therefore illustrated secured to the anti-cavitation plate 34 of an outboard drive or motor unit. The axial-flow speedometer includes a leading organic plastic mounting member 29 having a vertically extending threaded portion 31 which extends through a bore 35 in anti-cavitation plate 34 and is secured thereto by nut 13′, and a trailing organic plastic mounting member 33, secured to the opposite end portion of a thin, flexible spring steel beam 16′. A pair of transducer strain gauges 14′ are bonded to the upper and lower horizontal faces of beam 16′ and a waterproof vinyl sleeve 28′ surrounds and encloses the beam and transducers. Heat shrunk collars 30′ and 32′ overlap the ends of sleeve 28′ to provide the required watertight fit between the sleeve and members 20′ and 24′. Trailing probe member 33 includes a planar diving tab 36 mounted thereon at an angle to the boat's plane of movement.

The generally cylindrical shape and almost entirely organic plastic construction of speedometers 10 and 10′ considerably reduce the otherwise difficult problems involved in waterproofing the beam transducer portion of the device. The plastic sleeve 28 or 28′ may easily be slipped into position surrounding beam and secured to the adjacent plastic members using a conventional adhesive bonding material. The collars designated 30, 30′, 32 and 32′ are placed in position and heated to a temperature of approximately 450° F. to contract the collars, thereby providing a double waterproof seal at each end of the sleeve.

In operation, these speedometers gauge the boat's speed by measuring the deflection of beams 16 and 16′ caused by the movement of the speedometer through the water. As the speedometer is moved through the water, the force of the water on probe 25 or diving tab 36 causes a bending or stress of the beam that is proportional to the rate of water flow. This stress is sensed by and causes a change in the electrical resistance of the strain gauge transducers 14 bonded to the beam, as is well known in the art. By reading the resistance change of said transducers, as transmitted through their connecting wires, 38, 38′, 39, 39′ on an appropriately calibrated meter (not shown), the speed of the boat can easily be determined.

The transverse-flow speedometer of FIGS. 1 and 2, with or without probe protector 19, is particularly suited for use on relative low-speed boats and on boats having inboard motors. It is less satisfactory for high speed, planing boats whose hulls may not be continuously wetted with a continuous, unbroken stream of water. Furthermore on high-speed boats, probe-type speedometers even when constructed of relatively pliable plastic materials, and even if protected, have the disadvantage of being relatively susceptible to damage by debris, weeds and the like.

Axial-flow speedometer 10' is adapted for mounting closely adjacent the boat's propeller, the one part of a high-speed, boat-outboard motor combination that is nearly always subjected to a continuous flow of water. The faired leading portion 29' of speedometer 10' is both weedless and impact-resistant. The trailing diving tab 36 is similarly insusceptible to debris damage.

I claim:
1. A fluid flow metering device for use in a speedometer for gauging a boat's speed, said device comprising, in combination:
   a flexible beam;
   an organic plastic mounting member secured to one end portion of said beam, said mounting member being adapted for mounting on said boat;
   an organic plastic probe member secured to the other end portion of said beam, said probe member being adapted for positioning in the stream of water flowing relative to said boat for flexing beam in response thereto, the amount of flexure of said beam being proportional to the speed of said water stream relative to said boat;
   a waterproof, organic plastic sleeve surrounding and enclosing said beam, an end portion of said sleeve being sealed to each of said mounting and said probe members; and
   means including a strain gauge bonded to said beam for measuring the amount of flexure of said beam.

2. The device of claim 1 including an organic plastic collar surrounding and overlapping each end of said sleeve, each said collar engaging said sleeve and the adjacent portion of one of said mounting and said probe members.

3. The device of claim 2 in which said collars are made of a heat-shrinkable material and are contracted in position to insure watertight seals between said collars and said sleeve and said mounting and said probe members.

4. A fluid flow metering device for use in a speedometer for gauging a boat's speed, said device comprising in combination:
   a flexible, relatively thin metallic beam;
   an organic plastic mounting member secured to one end portion of said beam, said mounting member being adapted for mounting on said boat;
   an organic plastic probe member secured to the other end portion of said beam, said probe member being adapted for introduction into the water flowing relative to said boat for flexing said beam in response thereto, the amount of beam flexure being proportional to the speed of said water relative to said boat;
   means including a strain gauge bonded to said beam for measuring the flexure of said beam;
   a waterproof plastic sleeve enclosing said beam and said strain gauge, an end of said sleeve being sealed to each of said mounting and said probe members; and
   an organic plastic collar surrounding and overlapping each end of said sleeve, each said collar engaging said sleeve and the adjacent portion of one of said mounting and said probe members.

5. The device of claim 5 in which said collars are made of a heat-shrinkable material and are contracted in position to insure watertight seals between said collars and said sleeve and said mounting and said probe members.

6. The device of claim 5 adapted for mounting on said boat for axial movement through said water and in which said probe member includes a planar diving tab secured thereon at an angle to the plane of movement of said boat.

7. The device as claimed in claim 4 further including probe protecting means surrounding said probe and providing a tunnel for flow of water past said probe.

References Cited

UNITED STATES PATENTS

| | | | |
|---|---|---|---|
| 2,966,133 | 12/1960 | Hube | 73—228 |
| 3,115,777 | 12/1963 | Hochreiter | 73—228 |
| 3,147,620 | 9/1964 | Stapler | 73—228 |
| 3,188,421 | 6/1965 | Rowell | 73—228 |

LOUIS R. PRINCE, *Primary Examiner.*

NEIL B. SIEGEL, *Assistant Examiner.*